United States Patent [19]

Struck et al.

[11] Patent Number: 4,512,858
[45] Date of Patent: Apr. 23, 1985

[54] METHOD OF PRODUCING AN ELECTRODE USABLE AS A FLOW-THROUGH ANODE

[75] Inventors: Bernd D. Struck, Langerwehe; Francisco J. Dias, Jülich; Hartmut Luhleich, Düren; Ursula Paffen nee Siebert, Würselen, all of Fed. Rep. of Germany

[73] Assignee: Kernforschungsanlage Jülich Gesellschaft mit beschränkter Haftung, Jülich, Fed. Rep. of Germany

[21] Appl. No.: 579,654

[22] Filed: Feb. 13, 1984

[30] Foreign Application Priority Data

Feb. 19, 1983 [DE] Fed. Rep. of Germany ....... 3305753

[51] Int. Cl.³ .............................................. C25B 1/22
[52] U.S. Cl. .................................. 204/104; 204/290 R; 204/294; 427/113; 427/228
[58] Field of Search ................... 204/294, 290 R, 104; 427/113, 215, 228

[56] References Cited

U.S. PATENT DOCUMENTS

| | | | |
|---|---|---|---|
| 4,061,600 | 12/1977 | Moore | 204/294 |
| 4,265,727 | 5/1981 | Beckley | 204/294 |
| 4,304,643 | 12/1981 | Divisek | 204/104 |
| 4,306,950 | 12/1981 | Lu | 204/294 |
| 4,308,177 | 12/1981 | Tucker | 204/294 |

*Primary Examiner*—John F. Niebling
*Attorney, Agent, or Firm*—Frishauf, Holtz, Goodman & Woodward

[57] ABSTRACT

An anode for electrolytic oxidation of sulfur dioxide is made by coating an electrode of a graphite-like carbon material with a layer of cokable organic material such as sugar, phenolic resin, and asphalt pitch, heating the coated electrode body in an inert atmosphere to a temperature of between 400° to 800° C. and thereafter heating the coated electrode to a temperature in the range of 1400° to 2000° C., so that the material is first coked on the graphite to produce a porous flow-through electrode body which, thereafter, is heated to a higher temperature, followed by cooling.

6 Claims, 1 Drawing Figure

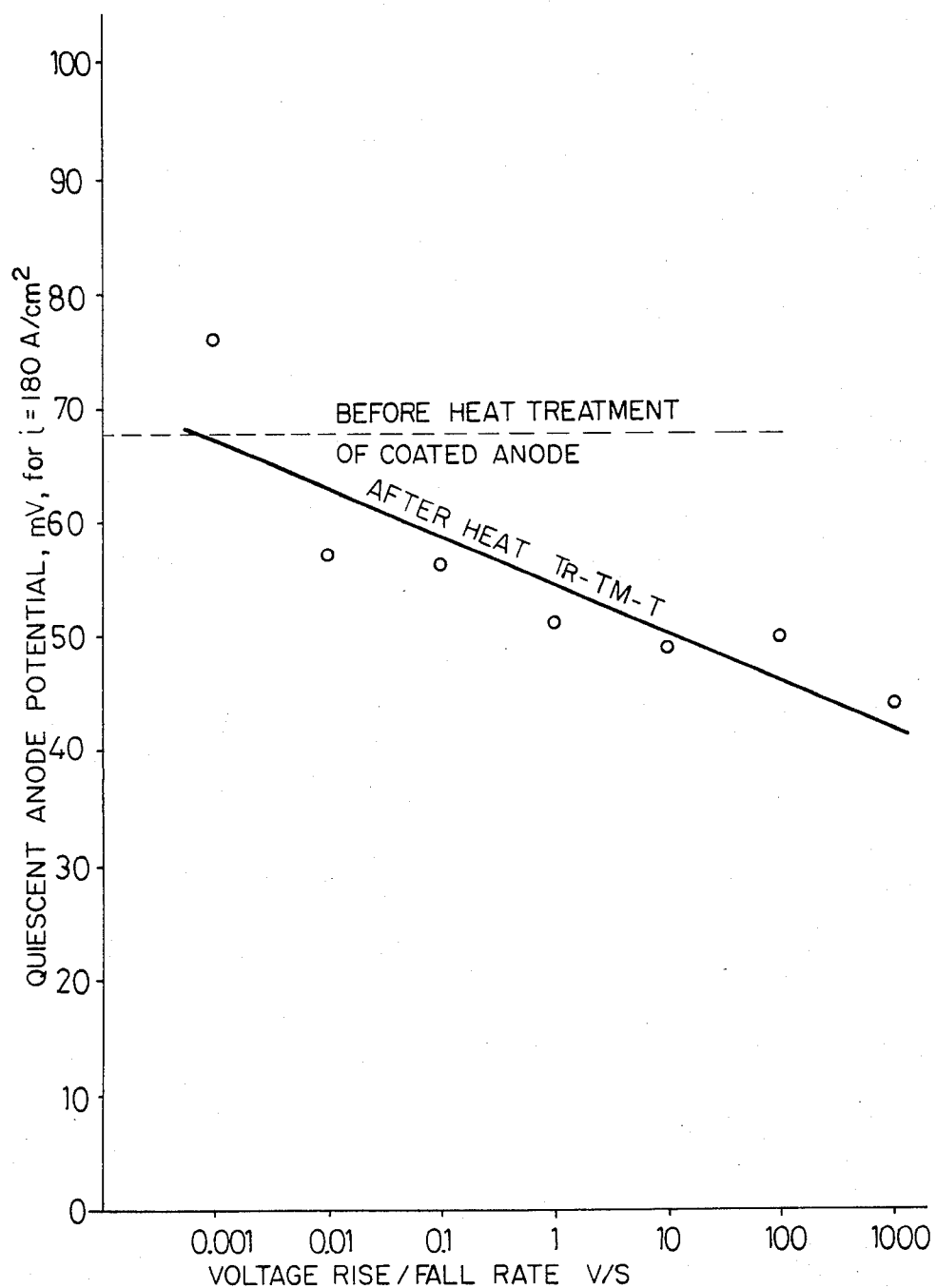

METHOD OF PRODUCING AN ELECTRODE USABLE AS A FLOW-THROUGH ANODE

This invention concerns a method of producing an electrode of graphite and/or a material similar to graphite that is usable as an anode, particularly in the anodic oxidation of sulfur dioxide. The invention also concerns a particular utilization of an electrode so prepared.

Electrodes of such material for use in the anodic oxidation of sulfur dioxide are known. They are usable, for example, in the electrolysis cell designed for the sulfuric acid hybrid cycle process in which sulfur dioxide from waste gases is anodically oxidized as well as for manufacture of sulfuric acid from sulfur dioxide. The known electrodes are also usable as analyzers for determining sulfur dioxide concentrations.

For energy-saving performance of the above-mentioned processes it is desirable, among other things, to have available electrodes of the above-mentioned kind which are as active as possible. Thus, for example, it is pointed out by K. Wiesener in "Zur anodischen Oxydation von Schwefeldioxid an porösen Kohleelektroden in sauren Elektrolyten", Wiss. Z. Techn. Univers. Dresden, 21-1972, 513–518, that efforts have been made to activate carbon electrodes by heating to a temperature from 400° C. to 1100° C. in an oxidizing atmosphere (air, $H_2O$, $CO_2$). The carbon electrodes were designed for direct anodic oxidation of $SO_2$ to produce sulfuric acid. Compared to the use of untreated carbon electrodes, however, the current density at constant potential increased only slightly.

A process for activating an electrode is also known from German Pat. No. 28 36 353, in which, by means of a binder, especially a rubber binder, a thin layer of activated carbon is bonded to the graphite body of the electrode. The use of this known electrode indeed leads to an improvement of the power handling capability of the electrolysis. Nevertheless, even in manufacture of the electrode, the covering of a part of the activated carbon that is to be applied by the binder cannot be entirely prevented, with result that the effectiveness of these covered portions of the activated carbon for the activation of the electrode is lost.

SUMMARY OF THE INVENTION

It is an object of the present invention to provide a method for producing an electrode of graphite or a carbon material similar to graphite which is more suitable for use as the anode in the electrolytic oxidation of sulfur dioxide than electrodes heretofore known in which, in particular, will provide as much energy saving as possible in the operation in such an electrolytic process, so far as this can be affected by the provision of an improved electrode.

Briefly, there is provided on the electrode body a coating of a cokable material such as a sugar, a phenylformaldehyde resin, or asphalt pitch or the like, after which the electrode body is heated up to a temperature in the range from 400° to 800° C. in an inert gas atmosphere for coking the applied layer, after which it is then heated up further to the temperature range of 1400° C. to 2000° C.

The process of the invention has been found to lead to the provision of an electrode which can be installed to reduce the energy consumption in the anodic oxidation of sulfur dioxide. Such an electrode can be used in an electrolysis cell for anodic oxidation of sulfur dioxide in aqueous sulfuric acid of a maximum concentration of 60% by weight at $SO_2$ partial pressures of at least $1 \times 10^{-7} bar$, especially with an addition of hydrogen iodide to the electrolyte within the range from 0.0001% to 1% by weight and at temperatures from 20° C. to the boiling point of the sulfuric acid, at current densities higher than 1 $uA/cm^2$.

A suitable implementation of the process of the invention includes the step of applying a layer of cokable material on an electrode body made of graphite felt.

For the case in which the electrolyte must flow through the electrode, which requires in the electrode an homogeneously distributed externally open pore system, a porous, permeable electrode body is used made of a mixture of graphite and/or a carbon material (similar to graphite) and a binder which is then coated with the cokable material. In such a case it is advantageous to begin with an electrode body made in accordance with a process that has not yet been made public and is the subject of copending U.S. patent application Ser. No. 579,656, filed Feb. 13, 1984.

According to that unpublished disclosure, in order to produce a porous, permeable molded body of carbon to serve as the electrode body, there is first made a green-state precursor body out of a composite powder of powdered carbon and a cokable organic binder. The molded precursor body is then broken up into a granulate that is as coarse as possible and from that granulate a grain-size fraction is sifted out with a maximum ratio of grain size, (largest to smallest) of at least 2:1 and typically 1.5:1, somewhere within the grain-size range of 0.2 to 10 mm. From that granulate fraction, obtained by sifting, a second green body is molded with a careful application of pressure which must be very light if the permeability is to be very large and may be the heavier, the less the permeability is required to be. Then, in order to make an electrode body for implementing the present invention, the second green body is coked in vacuum or in an inert gas atmosphere up to a temperature in the range between 600° and 1000° C. to produce a porous flow-through electrode body. The electrode body thus made, is then, according to the teaching of the present invention, further heated to a temperature in the range from 1400° C. to 2000° C. In this case no further coating of cokable material is necessary on the coked second green body before the treatment according to the invention in the higher temperature range (1400° C. to 2000° C.) as might be expected in the light of the present invention, because the higher temperature treatment in accordance with the invention immediately follows the coking of the second green body.

It has been found desirable for the composite powder, from which the above-mentioned green-state precursor body for the electrode is molded, to be produced by a process known from German Pat. No. 20 40 252, the contents of which are hereby incorporated by reference and are stated in translation at the end of the present specification. This is significant because in this manner it is assured that the precursor body itself will already have a comparatively high porosity and at the same time a relatively high strength. according to this known method the composite powder starting material for the first molding step is made by suspending carbon powder consisting of ground coke, electrographite, natural graphite wood charcoal or other vegetable charcoal, carbon black to two or more of the foregoing powders in a first liquid in which thereafter a binder consisting of pitch, tar, synthetic resin or the like is partly or entirely dissolved in that first liquid, which is, of course chosen to provide at least partial solubility for the binder. The resulting solution is then introduced into a second with which the first liquid is miscible, but in which the binder is either insoluble or soluble only with difficulty, the second liquid, in the case of phenolic resin or pitch is usually water. The carbon particles are precipitated with a coating of binder and settle in a muddy mass, which is then freed of the supernatent liquid by decanting, after which the mass is dried.

The preparation of the green precursor body from the preliminarily dried carbon can be carried out by known processes as die-pressing, extrusion, drossing or similar processes. At this stage it is of further advantage, however, to make use of the procedure described in German Pat. No. 21 33 044, the disclosure of which appears in U.S. Pat. Nos. 3,927,187; 4,059,682 and 4,060,592, in accordance with which the preliminarily dried powder is placed in the mold provided for the next molding step, and there exposed to the vapor of liquids in which the binder is entirely or partly soluble. A further drying step then precedes the coking in that process. The binder in the uncoked powder preferably constitutes more than 25% by weight and not more than 60%.

It is also of advantage to follow the method just described in the preparation of the second green-state body. The starting material for the second green body is the selected grain-size fraction of the broken up precursor body, which is placed in the mold provided for molding the second green body, exposed there to the vapor of liquids in which the binder is partly or entirely soluble, and then further dried in the closed mold. The breaking up of the green precursor body is preferably done with a jaw-type crusher which is so set as to provide a principal grain-size fraction corresponding to the desired permeability of the final product. The greater the gas permeabilty or the liquid permeability of the final product should be, the greater should the grain size be selected. More particularly, that selection is usually performed by a corresponding choice of a sieve fraction. From such a powder of relatively uniform grain size a green body is again produced, for example by die pressing, in which case for a given grain size the permeability of the end product is the greater, the smaller the pressing force.

At this stage of the process the use of the methods known from the above-mentioned German Pat. No. 20 40 252 for preparation of the composite powder starting material has a favorable effect, since as a result of the uniform coating of the powder grains with a binder skin the pressing forces necessary in the making of the second green body can be very small while still resulting in bodies of comparatively high strength.

As already mentioned, the second green-state body, made from the grain-size fraction contained from the breaking up of the precursor body, is pressed together from a granulate of coarse particles and, just as the coked final product, has relatively large pores.

A practical application in an electrolysis cell, furthermore, involves a preliminary procedure, prior to normal operation of the cell, in which the electrode provided in the cell and the anode is electrochemically oxidized by the application of a potential in the potential range for formation of hydroxide and/or oxide. The raised potential here involved should be applied not longer than about ten seconds and the applied potential should amount to at least 250 mV with reference to a reversible hydrogen electrode in the same solution. In this manner a further activation of the electrode for subsequent oxidation of sulfur dioxide is obtained. The intensity of the oxide covering of the graphite surface can be varied by running through the voltage/time triangular sweep wave with different scan rates. High scan rates lead to a smaller oxide covering of the graphite surface than low scan rates.

An activated electrode in the sense of the objects of this invention can also be made by electrochemically oxidizing an electrode body of graphite and/or a material similar to graphite by applying, before the beginning of normal operation of the electrolysis cell, a potential in the range for formation of hydroxide and/or oxide. The applied potential again amounts to at least 250 mV with reference to a reversible hydrogen electrode in a solution which is the same. Here, again, it is desirable in the potential range of hydroxide and/or oxide formation to be applied no longer than ten seconds.

A particularly advantageous use of the electrode has been found to be its use in an electrolysis cell for anodic oxidation of sulfur dioxide in the presence of hydrogen iodide in sulfuric acid of a concentration between 30% by weight and 58% by weight with an addition of 0.005% to 1% by weight of hydrogen iodide, at a partial $SO_2$ pressure of at least 0.1 bar and a temperature in the range between 80° and 120° C., with a current density of at least 100 mA/cm$^2$.

EXAMPLE 1

A disk of graphite felt of type GFA 10 of the Sigri company (open volume about 95% by volume) having a surface area of 10 cm$^2$ and a thickness of 10 mm was dipped in an ethanol solution of a phenol-formaldehyde resin (30% by weight). After removal of the felt disk the ethanol was evaporated. The phenol-formaldehyde resin with which the prepared graphite felt had thus been impregnated was coked at 650° C. in an atmosphere of inert gas. The graphite felt piece thus prepared was set in a graphite ring mounting holder. Using this structure as a flow-through electrode in a cell, measurements of the anodic oxidation of $SO_2$ in the presence of HI were carried out under the following conditions:

the composition of the anolyte, by weight, was 50% $H_2SO_4$ with 0.15% HI and $SO_2$ at 1 bar and $SO_2$-saturated electrolytes.

The temperature was 88° C.

The electrode immersed in the electrolysis cell, was partly covered. The uncovered active area was 5 cm$^2$.

The through flow velocity of the anolyte was 700 cm$^3$/min.

Cyclic voltammetry served as a method of measuring the electrochemical current-voltage curves under quasi-stationary conditions (3 mV/s). The reference electrode was a dynamic hydrogen electrode in 50% (by wt.) $H_2SO_4$ at 88° C. and 1 bar. From the measurements resulted:

| at a current density of | a potential of |
|---|---|
| 200 mA/cm$^2$ | 540 mV |
| 300 mA/cm$^2$ | 605 mV |
| 400 mA/cm$^2$ | 660 mV |

After the measurement the electrode was washed, dried and heated up to 1500° C.

The next measurements showed:

| at a current density of | a potential of |
| --- | --- |
| 200 mA/cm$^2$ | 520 mV |
| 300 mA/cm$^2$ | 580 mV |
| 400 mA/cm$^2$ | 635 mV |

EXAMPLE 2

A composite powder was made of electrographite powder and 30% by weight of a phenol-formaldehyde resin in accordance with the above-described method known from German Pat. No. 20 40 252. A green precursor body was made therefrom by pressing into a plate in a suitable mold. The green body was then coarsely broken up and then further broken up in a jaw-type crusher. A grain-size fraction running from 0.5 mm to 0.9 mm diameter was sifted out and then molded with pressure of 250 mbar into a green body of 35 mm diameter and 10 mm height. This green body was then coked by heating in an inert gas atmosphere at 800° C.

With this porous flow-through electrode so produced, electrochemical measurements were carried out under the conditions set forth in Example 1. These measurements showed:

| A Current Density Of | A Potential Of |
| --- | --- |
| 200 mA/cm$^2$ | 530 mV |
| 300 mA/cm$^2$ | 600 mV |
| 400 mA/cm$^2$ | 670 mV |

The electrode was then cleaned, dried and then calcined in vacuum at a temperature of about 2000° C. A new set of measurements showed:

| A Current Density Of | A Potential Of |
| --- | --- |
| 200 mA/cm$^2$ | 510 mV |
| 300 mA/cm$^2$ | 560 mV |
| 400 mA/cm$^2$ | 610 mV |

Example 3

A graphite felt body (Deutsche Carbone RVG 4000) was oxidized at room temperature by electrochemical oxidation of the electrode surface (10 cm$^2$, thickness 728 mm) in an electrolyte of 50% $H_2SO_4$ by weight. This was performed by a single back and forth sweep of a voltage/time triangular wave. The potential interval was 300 mV (start) to 1700 mV, with reference to the dynamic hydrogen electrode (DHE) in the same electrolyte.

The catalytic activity of this electrode with reference to the anodic oxidation of sulfur dioxide in the presence of hydrogen iodide was measured under the following conditions;

anolyte 50 wt. percent $H_2SO_4$ plus 0.15 wt. percent HI plus $SO_2$ (1 bar, saturated electrolyte).

temperature: 80° C.

flow through speed of anolyte: 1650 cm$^3$/min.

BRIEF DESCRIPTION OF THE DRAWING

The results of a test of the above-described electrode are described with reference to the annexed drawing, the single FIGURE of which is a graph showing anode potential minus rest potential of the anode plotted against the scan rate in volts per second.

FURTHER DESCRIPTION OF EXAMPLE 3

The drawing shows experimental results at constant current density of 180 mA/cm$^2$ of the voltage difference between the rest potential of the anode and the measured anode potential as a function of the scan rate used in activation. This voltage difference becomes smaller, i.e., the anode potential is improved, the higher the scan rate of activation is.

Scan rates for activation which are greater than 10 mV/s improve the anode potentials, whereas scan rates that are too small, in this case 1 mV/s, deteriorate the anode potentials compared to the anode potential for the unactivated graphite felt. The latter anode potential is shown as a horizontal broken line in the drawing.

Although the invention has been described with reference to specific illustrative examples, it will be seen that variations and modifications are possible within the inventive concept.

THE PROCESS OF GERMAN PAT. NO. 20 40 252

This process is based on the recognition that in the injection of a solution of a suitable binder, for example a phenol resin binder, into water under certain circumstances, an emulsion is formed without the precipitation of the binder. If particles of a filler material are present in an emulsion thus formed, the emulsion droplets stick to the filler particles and coat the latter with a thin layer, while the solvent in which the binder was previously dissolved is dispersed into the water, with which it is miscible.

Accordingly, the filler is first suspended in a known way in a first liquid in which the binder is thereafter dissolved in whole or in part and the solution is then introduced into a second liquid with which the solvent is miscible but in which the binder is insoluble or soluble only with difficulty, as in the case of water, with the formation of an emulsion, as the result of which the grains or particles of the filler are coated with the binder and settle, forming a muddy mass, which is thereafter freed in a known way by decantation of the supernatant liquid an only partial solution of the binder in this case forms either an emulsion or a suspension in the liquid in which it is introduced.

The dissolved binder along with the suspended filler is in practice injected into the other liquid. When, for example, water is used as the emulsifying liquid and a phenol resin as the binder, it has been found that methanol is advantageous as solvent. By variation of the water temperature or by a known additive which reduces the surface tension of the emulsifying liquid, it is possible to influence over a wide range the structure of the mud which is produced in the practice of the method according to the reference and which sinks to the bottom. Thus, in those cases in which it was desired to produce an end product of comparatively high strength, with phenol resin being used as the binder, it was found effective to use cold water as the emulsifying liquid. When needed it is advantageous in the performance of the method of this reference to wash the mud that is formed with the liquid used to form the emulsion before the mud is dry. The dried mass can conveniently be ground to a predetermined grain size after drying. It has been found that a graphite produced by the method of this reference could also meet very high requirements set for such material.

EXAMPLE I 80 g of a coke used as a filler, with a grain size of 50 to 100 μm, were suspended in 100 ml of methanol and then 20 g of phenol resin was dissolved in the methanol. The suspension of the filler and the solution of the binder took place in a pressure vessel with a funnel-shaped bottom to which had been fitted a valve and an attached flexible tube, at the free end of which was a nozzle. An overpressure of 5 atmospheres was produced in the pressure vessel by means of an inert gas and then the suspension formed in the pressure vessel was squirted into 1000 ml of pure water by opening the valve, the nozzle opening being at this time below the water level. The nozzle was so constructed that the suspension squirted into the water dispersed itself in a very short time and in very fine subdivision in the emulsifying liquid. The temperature of the emulsifying liquid did not exceed 12° C. In this way the result was obtained that the mud produced as above described settled in a very short time as a fine-grained mass. The time span within which the particles of filler coated with the binder settled lay somewhere between 10 and 15 minutes. Then the supernatant liquid was poured off and the remaining muddy mass was spread out on a piece of sheet metal and dried.

EXAMPLE II 80 g of the coke used as filler, with a grain size lying between 50 and 100 μm, were suspended in 100 ml of benzol and 20 g of a resin of phenol base was dissolved therein. Then the suspension was sprayed to a 30% by volume solution of methanol in the manner described in Example I. By the addition of water, the result was reached that the solubility of the resin component in the emulsifying liquid was reduced. In this variation of the process of the invention, the filler grains were also coated evenly by the binder and settled after about 10 to 15 minutes. The further process steps corresponded to those carried out in Example I.

EXAMPLE III 80 g of the coke used as filler, with a grain size from 50 to 100 μm, were suspended in 100 ml of xylol and then 20 g of a secondary pitch were dissolved so far as possible with warming and stirring. The mixture was then cooled down with simultaneous stirring. The suspension formed in this way was poured into 1000 ml of methanol which contained about 10 to 20% water. The mud thereby formed had settled after about 10 to 20 minutes, after which the liquid standing thereabove was decanted. After that, the mud was dried.

EXAMPLE IV 80 g of the coke used as filler, with a grain size of 50 to 100 μm, were suspended in 100 ml of nitro benzol, after which 20 g of an electrode pitch were dissolved as extensively as possible with warming and stirring. The suspension formed in this way was cooled with stirring. Then the suspension was squirted into about 100 ml of a mixture consisting of 80% by volume methanol and 20% water. The mud thereby formed settled in 5 to 10 minutes, after which the supernatant liquid was decanted and the mud was dried, as described in Example I.

We claim:

1. Method of producing an electrode usable as an anode in the anodic oxidation of sulfur dioxide having an electrode body of graphite-like carbon material, comprising the steps of:
    coating said electrode body with a layer of cokable organic material selected from the group consisting of sugars, phenolic resins and asphalt pitch;
    heating the coated electrode body in an inert atmosphere to a temperature in the range from 400° to 800° C., thereby coking said layer, and
    directly thereafter heating said coated electrode to a temperature in the range from 1400° to 2000° C., followed by cooling.

2. Method according to claim 1, in which said electrode body is a body of graphite felt.

3. Method according to claim 1, in which the additional step is performed, prior to normal operation of the electrolysis cell in which said electrode is to provide the anode, of applying to said anode in said electrolysis cell, for not more than 10 seconds, an electrical potential in the potential range within which hydroxide and oxide are formed on the electrode by electrochemical exoidation, said potential being at least 250 mV with reference to a reversible hydrogen electrode in the same electrolyte solution.

4. Method for producing an electrode of graphitic carbon material which is suitable for use as an anode in the anodic oxidation of sulfur dioxide, comprising the final step, before the beginning of normal operation of an electrolysis cell in which cell electrode is to operate as the anode, which consists of applying in said cell to said electrode, for not more than 10 seconds, a potential in the potential range in which hydroxide and oxide is formed on the electrode by electrochemical oxidation, said potential being at least 250 mV with reference to a reversible hydrogen electrode in the same electrolyte solution.

5. Method of anodic oxidation of sulfur dioxide in an electrolytic cell, having anode and cathode electrodes, comprising the steps of:
    preparing the anode electrode by coating an electrode body of graphite-like carbon material with a layer of cokable organic material selected from the group consisting of sugars, phenolic resins and asphalt pitch;
    heating the coated electrode body in an inert atmosphere to a temperature in the range from 400° to 800° C., thereby coking said layer, and
    directly thereafter heating said coated electrode to a temperature in the range from 1400° to 2000° C., followed by cooling;
    then placing the cooled coated and heat treated electrode in said electrolysis cell, together with an aqueous electrolyte in said cell, having 30 wt. % to 50 wt. % sulfuric acid with an addition of 0.005 wt. % to 1 wt. % of hydrogen iodide, sulfur dioxide being provided to said electrolyte at a partial pressure of at least 0.1 bar and a temperature in the range between 80° and 120° C., while a current density of at least 100 mA/cm$^2$ is passed through said cell for anodic oxidation of said sulfur dioxide.

6. Method according to claim 5, in which prior to the beginning of normal operation in said electrolysis cell for anodic oxidation of sulfur dioxide with said current of 100 mA/cm$^2$, there is applied to said coated and heat treated anode electrode, for not more than ten seconds, a potential in the potential range in which hydroxide and oxide is formed on the electrode by electrochemical oxidation, said potential being at least 250 mV with reference to a reversible hydrogen electrode in the same electrolyte solution.

* * * * *